(12) United States Patent
Hozoji

(10) Patent No.: US 10,289,106 B2
(45) Date of Patent: May 14, 2019

(54) CONTROL PROGRAM MAINTENANCE DEVICE, CONTROL PROGRAM MAINTENANCE METHOD, AND PROGRAM

(71) Applicant: Kabushiki Kaisha Toshiba, Minato-ku, Tokyo (JP)

(72) Inventor: Harumi Hozoji, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 53 days.

(21) Appl. No.: 15/503,984

(22) PCT Filed: Oct. 16, 2015

(86) PCT No.: PCT/JP2015/079372
§ 371 (c)(1),
(2) Date: Feb. 14, 2017

(87) PCT Pub. No.: WO2016/060266
PCT Pub. Date: Apr. 21, 2016

(65) Prior Publication Data
US 2017/0235302 A1    Aug. 17, 2017

(30) Foreign Application Priority Data

Oct. 17, 2014  (JP) ................................. 2014-212516

(51) Int. Cl.
*G05B 23/02* (2006.01)
*G05B 19/042* (2006.01)

(52) U.S. Cl.
CPC ..... *G05B 23/0213* (2013.01); *G05B 19/0426* (2013.01); *G05B 23/0272* (2013.01)

(58) Field of Classification Search
None
See application file for complete search history.

(56) References Cited

U.S. PATENT DOCUMENTS

2006/0190105 A1* 8/2006 Hsu .......................... G06F 8/34
                                                                  700/86
2016/0179653 A1* 6/2016 Suzuki ................... G06F 8/436
                                                                  717/126

FOREIGN PATENT DOCUMENTS

JP         H01-142804 A      6/1989
JP         2007-265252 A     10/2007
(Continued)

OTHER PUBLICATIONS

International Search Report mailed by Japan Patent Office dated Dec. 15, 2015 in the corresponding PCT Application No. PCT/JP2015/079372.

*Primary Examiner* — Ryan A Jarrett
(74) *Attorney, Agent, or Firm* — Knobbe, Martens, Olson & Bear, LLP

(57) ABSTRACT

According to one embodiment, a control program maintenance device includes a display processing unit that displays whether a first control program and a second control program are matched or mismatched on a display unit as a result of comparison. When a mismatch occurs, the display processing unit develops the configuration to a lower level by referring to a product tree; displays different parts in the control programs within the range to be compared on the display unit; and displays, in a developable manner and by referring to the product tree, mismatch parts in the control programs of a comparison source and a comparison destination before and after maintenance work is performed on a control program to be maintained.

17 Claims, 12 Drawing Sheets

(56) References Cited

FOREIGN PATENT DOCUMENTS

| JP | 2008-003725 A | 1/2008 |
|----|---------------|--------|
| JP | 2012-094087 A | 5/2012 |
| JP | 2013-109713 A | 6/2013 |
| JP | 2013-142933 A | 7/2013 |

* cited by examiner

CONTROL PROGRAM MAINTENANCE DEVICE, CONTROL PROGRAM MAINTENANCE METHOD, AND PROGRAM

CROSS-REFERENCE TO RELATED APPLICATIONS

This application is national stage application of International Application No. PCT/JP2015/079372, filed Oct. 16, 2015, which designates the United States, incorporated herein by reference, and which is based upon and claims the benefit of priority from Japanese Patent Application No. 2014-212516, filed Oct. 17, 2014, the entire content of which are incorporated herein by reference.

FIELD

Embodiments described herein relate generally to a control program maintenance device, a control program maintenance method, and a program.

BACKGROUND

In general, a control program for controlling a plant is designed and created according to the requirements specification of the plant. The control program is installed in a control device that includes a plurality of programmable controllers. The control program is used after confirming that the required functions can be operated safely.

However, based on subsequent changes in the operation conditions of the plant, various modification requests such as changes, additions, and deletions need to be made on the control program.

When a provider of the control program receives a modification request on the operating control program such as the above, the provider needs to perform the modification work, by confirming whether the control program that is managed as a master control program in a providing source is matched with the operating control program, before starting the modification.

However, in a large-scale control system, large and small modifications are made multiple times on the control system by a lot of people during a long period of time. Because the quality of the modified control program is manually confirmed, the provider of the control program needs to spend a lot of time and effort every time a modification request is received.

Thus, a technology of automatically detecting changes, additions, and deletions on a plurality of parts in a control program has been disclosed.

For example, there is a control program maintenance method that includes: a dividing process of dividing an executable control program including an operation code and an operand into a single block of relating process step groups; a comparison process of comparing the two or more blocks of divided control programs; and an output process of outputting the comparison results.

Also, in the control system, in addition to the modification of the control program, a change may be made in conjunction with the moving of an input and output device or the like. To cope with such a case, an engineering device that is capable of reducing the time required for process of moving or changing the device and enables the process of moving or changing the device while preventing a design error has been disclosed.

In general, modification work (in this example, also referred to as maintenance work, and is used as a synonym) of a control program for controlling a plant is performed by a number of programmers. Thus, a control program maintenance system has been desired that can prevent human error and can clearly compare the modified parts before and after the change is made in a short period of time, and the modification content of the system can easily be shared among the workers.

The conventional control program maintenance method described above is capable of determining consistency, changes, additions, or deletions of the executable control programs at the divided control program level. However, it takes time to confirm the quality of the control program before and after the modification is made, because a large number of confirmations must be made.

The present invention has been made to solve the problem described above, and an object of the present invention is to provide a control program maintenance device, a control program maintenance method, and a program that can determine a modified part and a modified content in a control program in a short period of time; that can easily share the modification quality; and in which the maintenance quality and the maintenance work efficiency of the control program are improved; in the control program maintenance device for controlling a plant that is to be provided in a programmable controller of a control system.

DETAILED DESCRIPTION

In general, according to one embodiment, a control program maintenance device is capable of connecting to a plurality of control device via a network. The control device each executes predetermined control by downloading a contril program that is used in a control system for controlling a plant from the control program maintenance device. The control program maintenance device includes a storage unit, a comparison unit, and a display processing unit. The storage unit stores therein a first control program and a product tree. The first control program is the control program that has been generated. The product tree is program configuration information in which a module configuration of each of the control devices and a program configuration of each module are associated with each other in a manner developable to a program step level. The comparison unit sets a range to be compared by referring to the product tree upon receiving a comparison request; and compares the first control program registered anew as a comparison source with a second control program uploaded from each of the control devices as a control program of a comparison destination. The display processing unit displays whether the first control program and the second control program are matched or mismatched on a display unit as a result of comparison. When a mismatch occurs, the display processing unit develops the configuration to a lower level by referring to the product tree; displays different parts in the control programs within the range to be compared on the display unit; and displays, in a developable manner and by referring to the product tree, mismatch parts in the control programs of the comparison source and the comparison destination before and after maintenance work is performed on the control program to be maintained.

Hereinafter, an embodiment of the present invention will be described with reference to the accompanying drawings.

The present embodiment describes a control program maintenance device that can easily view changes, additions, and deletions made on a mismatched part, by registering executable control programs and a product tree in advance when an original control program is created and by comparing and collating configurations of the control programs of a comparison source and a comparison destination. The executable control programs include a first control program and a second control program. The first control program is stored in the control program maintenance device and is used as the comparison source. The second control program is downloaded from the control program maintenance device, is stored in a control device having been used in a plant, and is used as the comparison destination (modification target). The product tree is program information determined based on the configuration of the control device.

Figure 1:
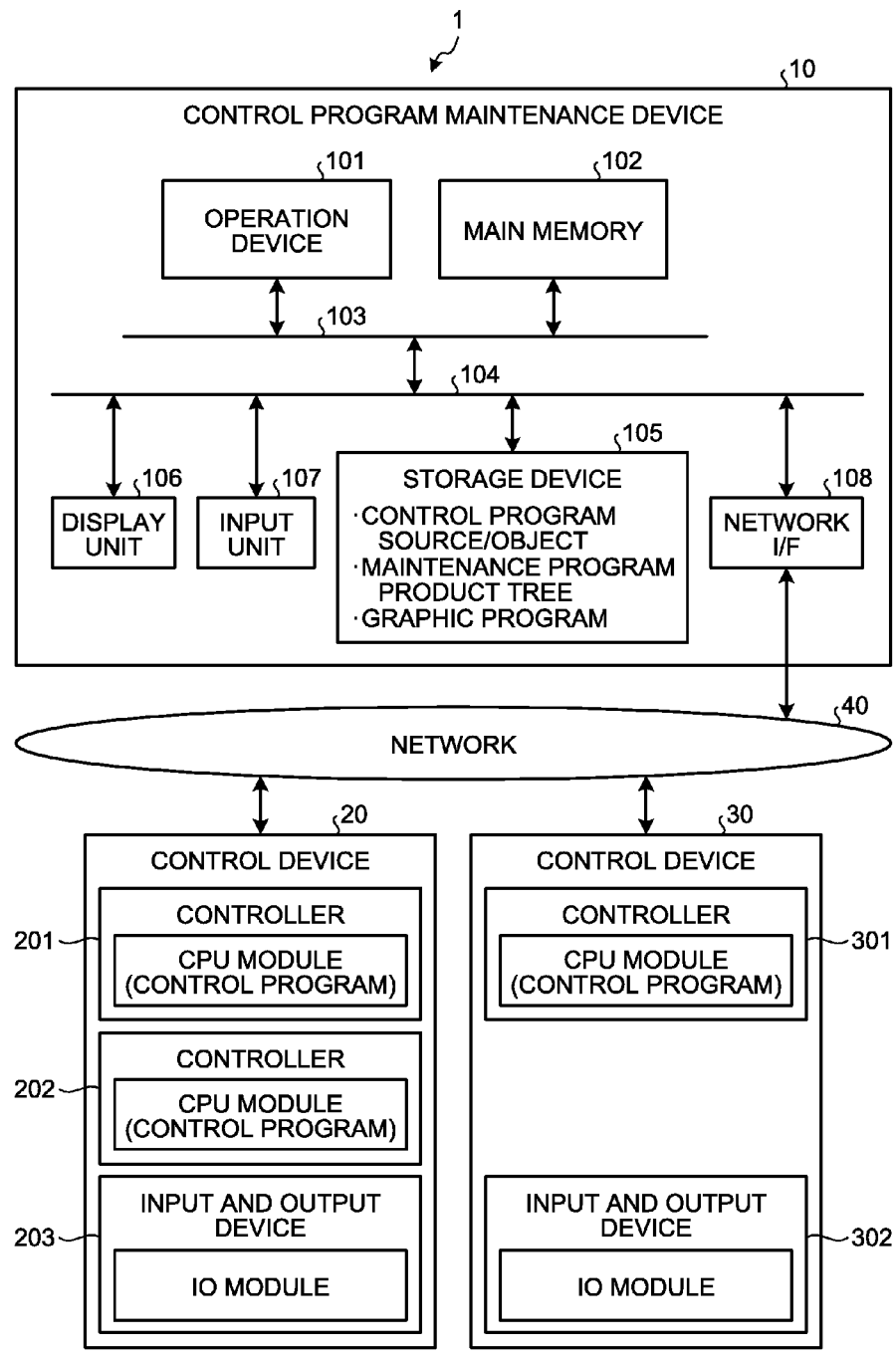
FIG. 1 is a diagram for explaining an example of a configuration of a control program maintenance device in a control system of a present embodiment.

FIG. 1 is a block diagram illustrating an example of a configuration of a control program maintenance device according to a present embodiment.

In FIG. 1, the configuration of a present control system 1 will be described. The configuration of the present control system 1 includes a control program maintenance device 10, a control device 20 and a control device 30 that are connected via a network 40.

The optimum configuration as a control system is suitably selected for each of the control devices 20 and the control device 30, depending on the size and characteristics of the plant to be controlled.

The control device 20 or the control device 30 to be maintained uploads a control program that is stored in the control device 20 or the control device 30, to the control program maintenance device 10. The control program maintenance device 10 receives the control program that is uploaded from the control device 20 or the control device 30 to be maintained; detects the changes, additions, or deletions made on the control program; and supports the quality and efficiency of the maintenance work on the control program.

The configuration of the control program maintenance device 10 includes an operation device 101, a main memory 102, a memory bus 103, and an interface (I/O) bus 104. The memory bus 103 connects the operation device 101 and the main memory 102. The memory bus 103 and the I/O bus 104 are connected with each other.

The I/O bus 104 includes a storage device 105, a display unit 106, an input unit 107, and a network I/F 108. Each units of input and output controllers which are not illustrated have the storage device 105. The network I/F 108 is an interface for connecting between the control program maintenance device 10 and the control device 20 or the control device 30, via the network 40.

Next, a module configuration of the control device 20 and the control device 30 that are connected to the network 40 is selected so as to be optimum for respective plants controlled by the control devices 20 and 30. For example, the control device 20 includes a central processing unit (CPU) module (controller) 201, a CPU module (controller) 202, and an input and output (IO) module (input and output device) 203.

The control device 30 includes a CPU module (controller) 301 and an IO module (input and output device) 302.

A predetermined control program is downloaded from the control program maintenance device 10, to each of the CPU modules. Required programs are downloaded from the controllers in the control device 20 and the control device 30, to the IO module 203 and the IO module 302, respectively.

Next, detailed configuration of the units in the control program maintenance device 10 will be described.

For example, the storage device 105 is a semiconductor memory device and a magnetic disc device. The storage device 105 stores therein a program such as: an operating system and the like for the control program maintenance device 10; a maintenance program including a product tree that is program configuration information required for maintaining a control program; a graphic program for drawing; and a registered control program.

The control program to be registered in advance includes: a source program that is written in text language or graphic language based on International Standard (International Electrotechnical Commission (IEC)) 61131-3; and a compiled and executable control program. The control program is to be stored in the storage device 105. The control program may also be stored in, for example, another server device, instead of the control program maintenance device 10.

The input unit 107 is configured of an input device such as a keyboard and a mouse. For example, an operator who maintains the control program operates a screen on the display unit 106 and generates an input signal for comparing the control programs. The input signal is then transmitted to the operation device 101 via the input and output controllers, which are not illustrated, the I/O bus 104, and the memory bus 103.

For example, the display unit 106 is a liquid crystal display. The display unit 106 receives an output signal of comparison results of the control programs and the like from the operation device 101, via the memory bus 103, the I/O bus 104, and the input and output controllers, which are not illustrated; and displays the comparison results and the like on the screen.

The network I/F 108 is a communication device such as a local area network (LAN) card and a serial port. The control program maintenance device 10 is connected to the control devices 20 and 30 via the network I/F 108. The control programs in the control devices 20 and 30 are uploaded to the control program maintenance device 10, and the control program in the control program maintenance device 10 is downloaded to the control devices 20 and 30.

Next, the operation device 101 suitably writes a program to be executed and required data, from the storage device 105 to the main memory 102, and then executes the program. The operation device 101 functions as a comparison unit, a display processing unit, and a control unit as follows, by executing a control program maintenance program from the storage device 105.

Figure 2:
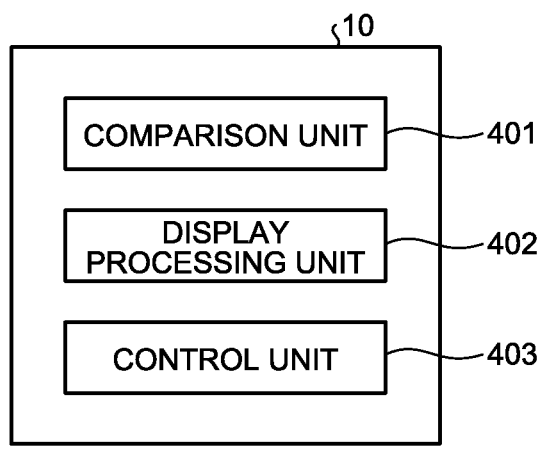
FIG. 2 is a block diagram illustrating an example of a functional configuration of the control program maintenance device of the present embodiment.

FIG. 2 is a block diagram illustrating an example of a functional configuration of the control program maintenance device 10 of the present embodiment. As illustrated in FIG. 2, the control program maintenance device 10 of the present embodiment includes a comparison unit 401, a display processing unit 402, and a control unit 403. Each unit functions when the operation device 101 executes the control program maintenance program from the storage device 105.

Upon executing the maintenance program, the comparison unit 401 performs a comparison process on the registered control program and the control program that is uploaded from the control device. The display processing unit 402 executes display processing of generating a start-up screen of a program to be executed, a display screen for outputting the comparison results, and the like. The control unit 403 receives a user input from the input unit 107, and performs various controls. Also, based on an instruction from the user, the control unit 403 generates a product tree which will be described below, and stores (registers) the product tree in the storage device 105.

Although details will be described later, the comparison unit 401 reads an executable first control program that is a comparison source, and a second control program that is uploaded from the control device and is a comparison destination to be maintained, to the main memory 102. The comparison unit 401 then compares and collates the programs to be compared at a configuration level of the control device that has been selected in advance.

The display processing unit 402 displays the results of the comparison process performed by the comparison unit 401 on the maintenance screen with the program that is written in graphic language. The display processing unit 402 outputs the above screen on the display unit 106 as an easily viewable screen.

Next, a procedure of the maintenance work of the control program maintenance device 10 configured as the above will be described with reference to FIG. 3A and FIG. 3B.

Figure 3A:
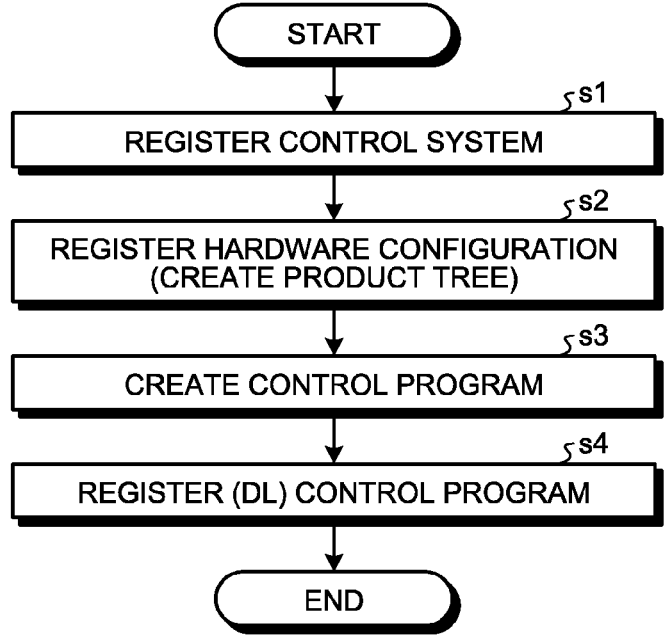
FIG. 3A is a flowchart of an example of a procedure of a control program creation process of the present embodiment.

FIG. 3A is a flowchart of an example of maintenance work on a control program that is to be a premise of the present maintenance work. FIG. 3B is a flowchart of an example of a procedure of a comparison process on the control programs, before and after the maintenance work is performed, using a maintenance program.

As illustrated in FIG. 3A, upon creating a control program, a control system is firstly registered (s1). The registration number may be a general number that can be authenticated.

Next, a "product tree" is registered in the storage device 105 (s2). In the "product tree", which is a characteristic of the present maintenance method, the hardware configuration of the system and the control program configuration are associated in a manner developable to a program step level (hereinafter, the program configuration information is referred to as a product tree). More specifically, upon receiving an instruction such as a user input, the control unit 403 generates the product tree, and then registers the generated product tree in the storage device 105.

Next, the user creates a control program corresponding to the present control system 1, by using a predetermined program editor, and the control unit 403 receives an input of the created control program (s3). The control unit 403 then registers the control program in the product tree, and downloads the control program to the control device (s4).

The control program registered in this manner will be then used in the plant, and various improvements will be made on the control program. Every time an improvement is made, the control program is updated.

Figure 3B:
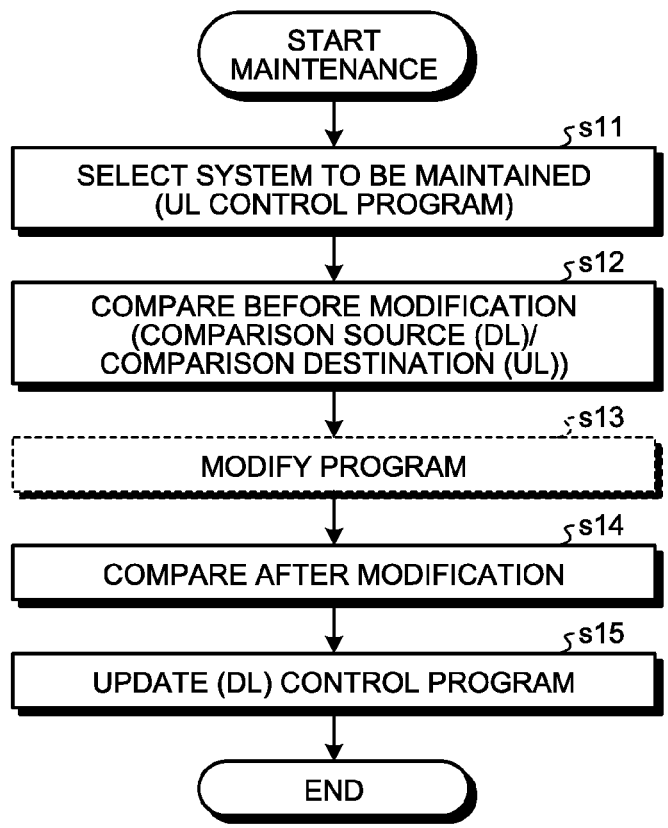
FIG. 3B is a flowchart of an example of a procedure of a maintenance process on a control program of the present embodiment.

In the present embodiment, the subsequent maintenance work on the control program is executed by the procedure illustrated in FIG. 3B.

First, the user selects a system to be maintained. Although details will be described later, the user selects the system to be maintained by referring to an operation screen. The control unit 403 then accesses the address of the control device that is the comparison destination (that is to be compared) via the network 40. The control unit 403 uploads the second control program corresponding to the selected control program to be maintained, from the control device to the control program maintenance device 10 (s11).

Before modifying the control program, the comparison unit 401 performs a comparison process on the registered first control program that is the comparison source of the comparison and the uploaded control program (second control program) (s12).

As a result, the user confirms the comparison results obtained by the comparison unit 401, indicating that the first control program and the second control program are matched with each other. The user then starts the maintenance work.

If the first control program and the second control program are mismatched by some reason, the display processing unit 402 develops the different parts to a program step level, displays and outputs the mismatched content, and determines the cause and countermeasures before performing the maintenance.

When the first control program and the second control program are matched with each other, the operation device 101 executes maintenance (equivalent to modification) work on the control program illustrated in FIG. 3A (s13).

The comparison unit 401 then performs a comparison process once again on the first control program after being modified and the first control program before being modified (s14). The display processing unit 402 graphically displays the changed part on the display unit 106 at a step level, and after confirming that users are matched, the control unit 403 registers the updated first control program based on the instruction by the user (s15).

Next, the configuration of the product tree included in the maintenance program and a method for generating the program information will be described with reference to FIG. 4 and FIG. 5.

Figure 4:
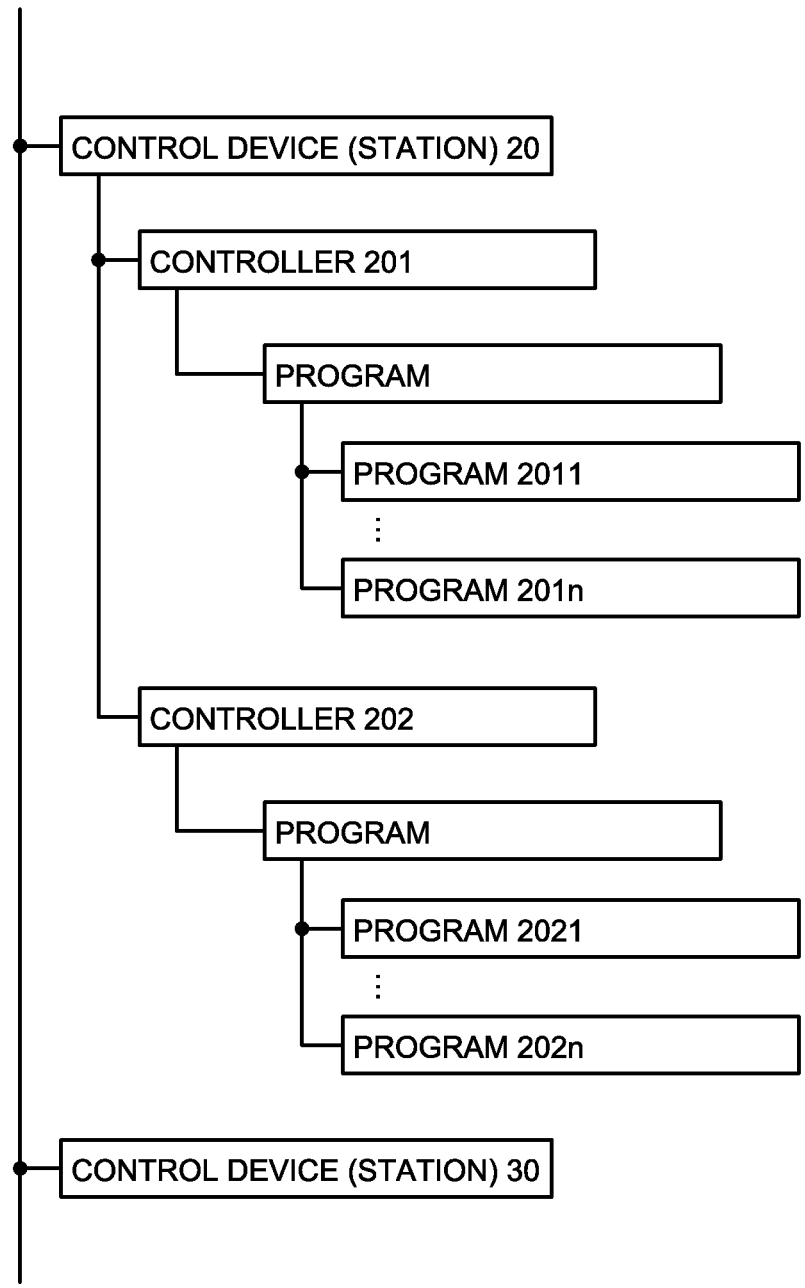
FIG. 4 is a diagram for explaining an example of a product tree in the control system of the present embodiment.

FIG. 4 is a diagram illustrating program configuration information in the control device 20 illustrated in FIG. 1 in a tree format.

In FIG. 4, the control device 20 includes the controller 201 and the controller 202. The controller 201 stores therein a program 2011 to a program 201n. The controller 202 stores therein a program 2021 to a program 202n.

Figure 5:
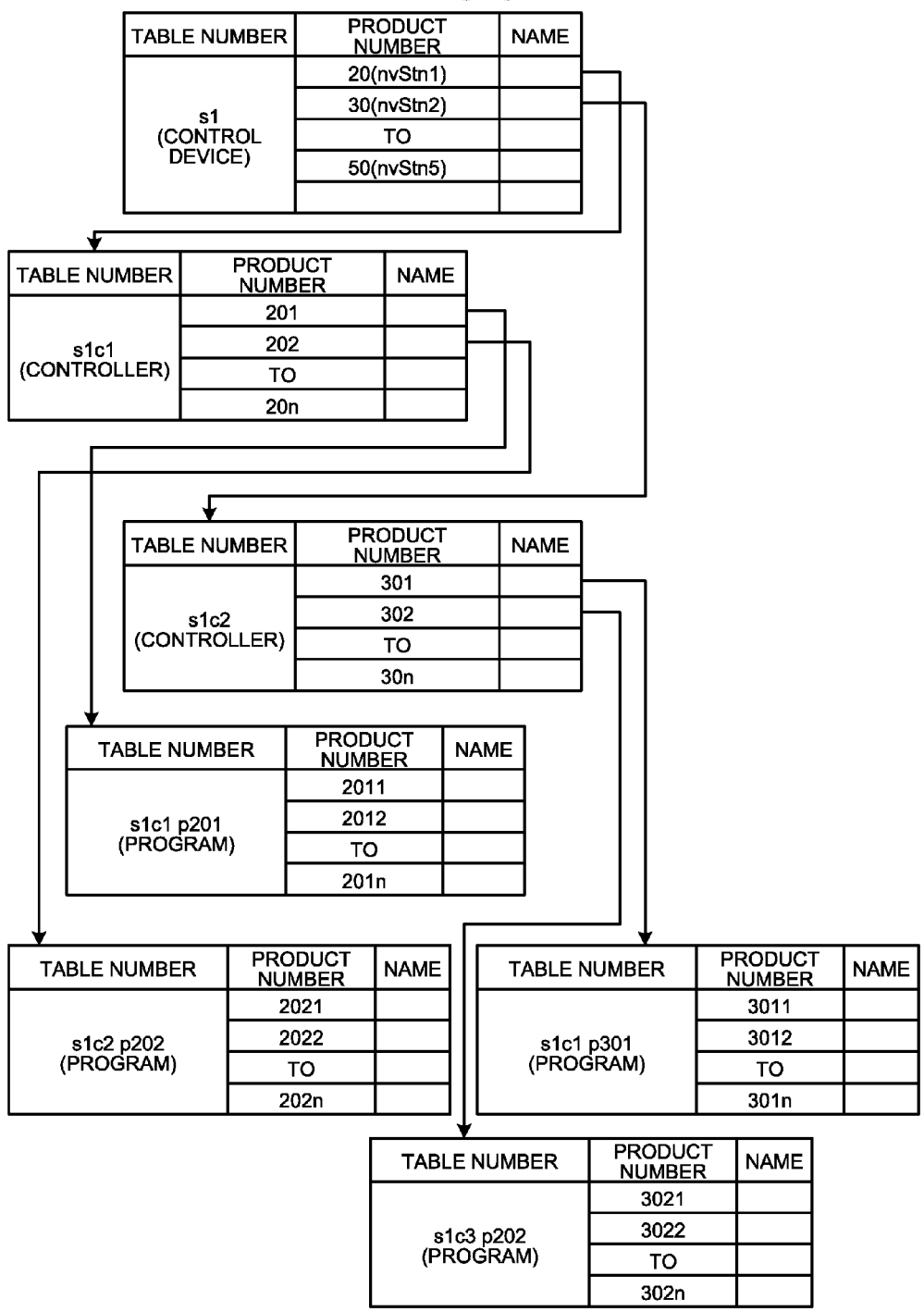
FIG. 5 is a diagram illustrating an example of the product tree configured with tables of the present embodiment.

The program configuration information associated with the hardware configuration can be associated using table numbers as illustrated in FIG. 5. For example, FIG. 5 indicates an association among a table number s1 that is the configuration of the control devices in the control system, a table number s1c1 that is the configuration of the controllers in one of the control devices 20 configuring the control system, and a program table s1c1p201 that is the configuration of programs to be stored in the controller 201.

Furthermore, tasks and worksheets that configure a program may be tabulated in more detail, as a program table which is not illustrated. Table identification numbers attached to respective tables may be associated in a tree format, and the module configuration of the device and the program configuration of each of the modules may be associated with each other.

Figure 6:
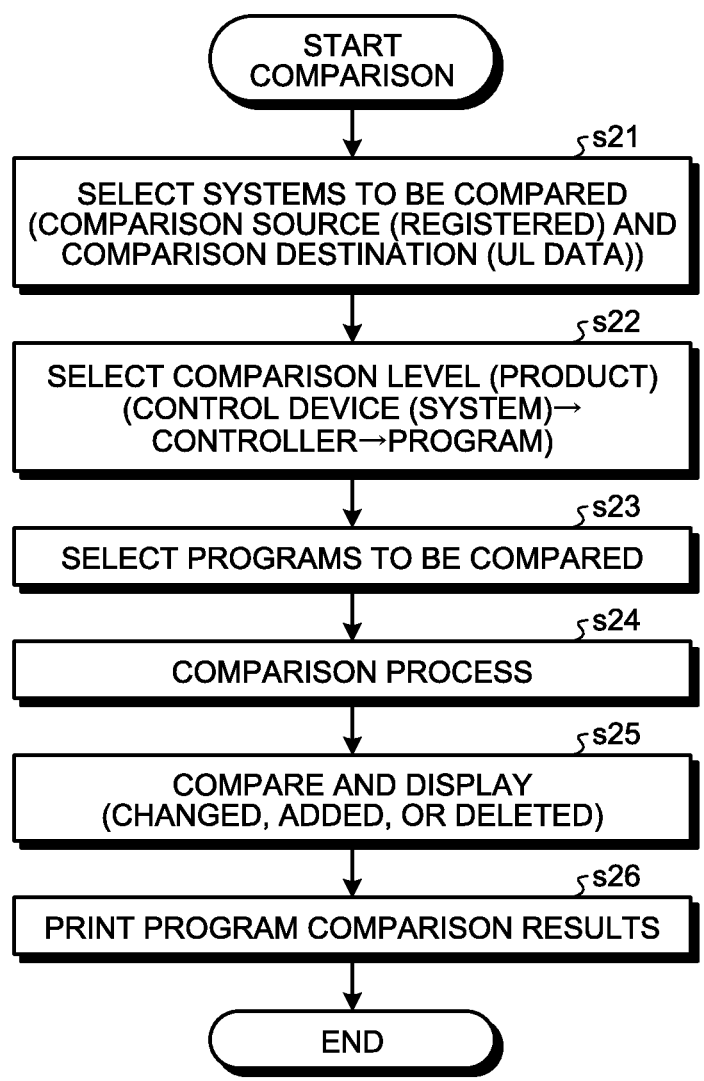
FIG. 6 is a flowchart for explaining an example of a comparison processing operation on a maintenance program of the present embodiment.

Next, an operation on a maintenance program performed by the control program maintenance device that is configured as the above will be described with reference to the flowchart in FIG. 6, and operations and display screens that are displayed on the display unit 106 illustrated in FIG. 7A to FIG. 14.

Figure 7A:
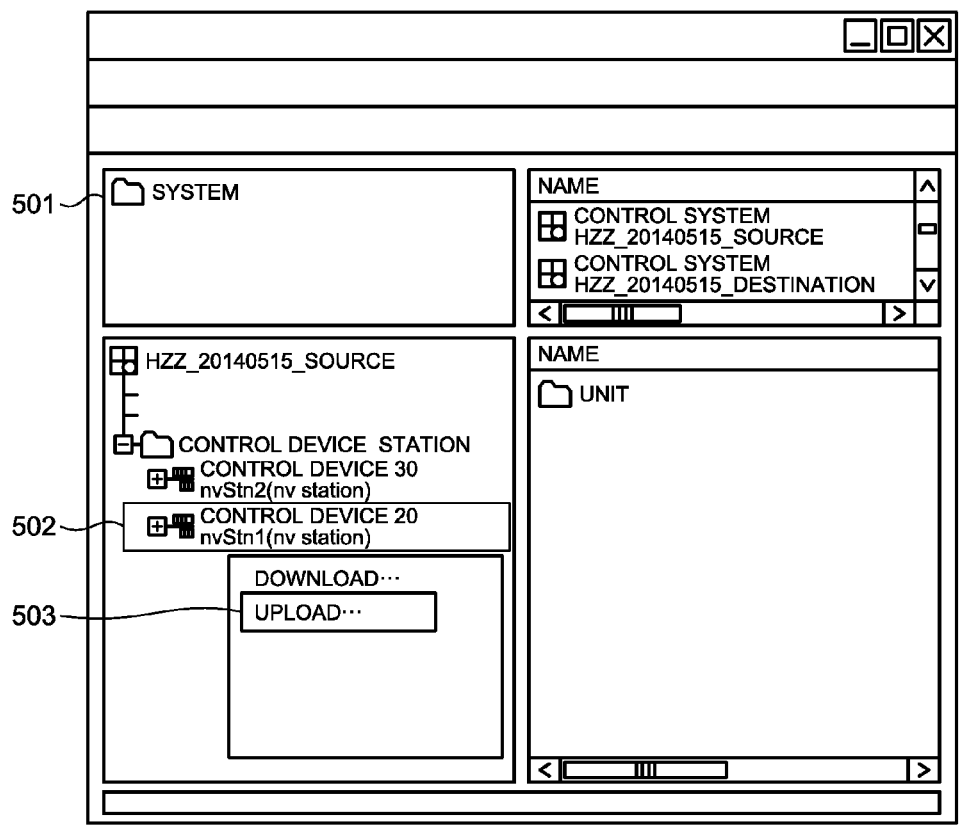
FIG. 7A is a diagram illustrating an example of a start-up screen of the maintenance program of the present embodiment.

First, the display processing unit 402 displays a system start-up screen on the display unit 106 as illustrated in FIG. 7A. In this example, the user selects control systems of a comparison source and a comparison destination in a control system 501 that are registered in advance (see reference numeral 502). The user then clicks upload 503 and instructs the control program maintenance device 10 to upload the control programs of the comparison source and the comparison destination in the control system (s21).

In the designing phase of the first control program, the server to be registered as a master may be used as the comparison source, and the present control program maintenance device 10 may be used as the comparison destination. However, the comparison source and the comparison destination may be suitably selected.

Figure 7B:
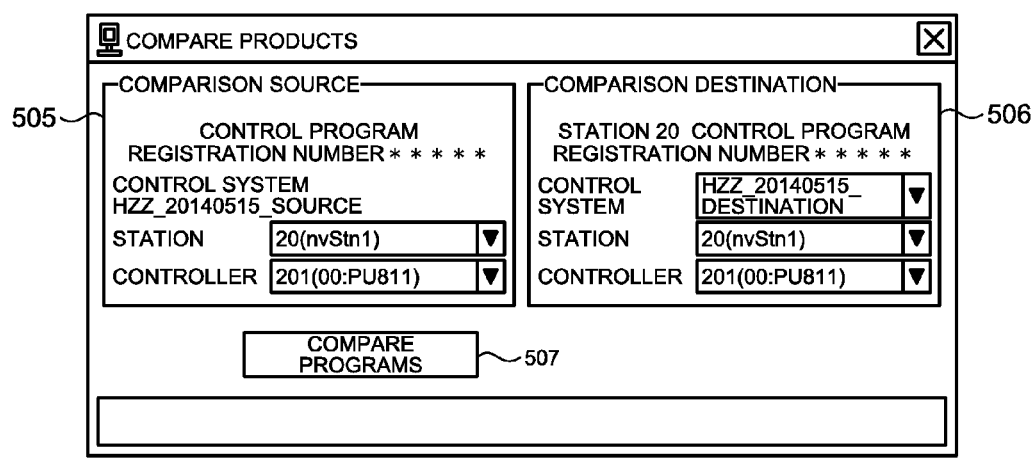
FIG. 7B is a diagram illustrating an example of a product selection screen on the start-up screen of the maintenance program of the present embodiment.

Then, as illustrated in FIG. 7B, in the selected control systems, the display processing unit 402 displays a product selection screen for selecting products to be compared, on the display unit 106.

In the product selection screen, the display processing unit 402 displays the control programs to a lower level in a developable manner, and causes the user to select a comparison level (product), based on the program configuration information in which the configurations of the control systems of the comparison source 505 and the comparison destination 506 are presented by product trees (s22).

In this example, the comparison levels on the product selection screen are set so that only the levels the user desires to compare are selectable, and the levels the user does not desire to compare are not selectable. For example, when the control device (in this example, displayed as a station) and the controller are not to be selected, the programs are compared at a system level; when only the station is to be selected, the programs are compared at a station level; and when only the controller is to be selected, the programs are compared at a controller level (s23).

Figures 8A, 8B:
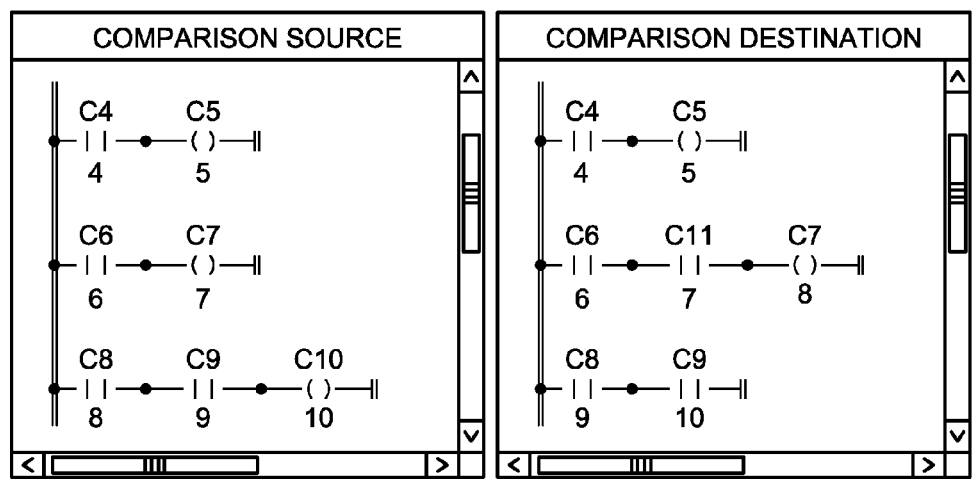
FIG. 8A is a diagram illustrating an example of a display screen of comparison processing results on the maintenance program of the present embodiment.
FIG. 8B is a diagram illustrating an example of the display screen of comparison processing results on the maintenance program of the present embodiment.

When the user clicks "compare programs" 507 and instructs the operation device 101 (comparison unit 401) to compare the programs, the operation device 101 (comparison unit 401) executes a comparison process (s24). As illustrated in FIG. 8A, the display processing unit 402 may display the comparison results in graphic language using symbols, in a table format. Also, as illustrated in FIG. 8B, the display processing unit 402 may determine the different parts in the control programs at a step number level, and may display the determination results with the table on which "Changed", "Added", or "Deleted" is described (s25).

The display processing unit 402 can also print the content of the comparison results (s26).

In the control program maintenance device as described above, it is possible to collectively determine the modification content of each of the modified parts (products) in the control programs before and after the modification is made in a short period of time. Also, it is possible to easily share the modification quality.

Even if modification work is performed by a large number of maintenance workers, it is possible to view and share the maintenance quality and the maintenance work content of the control program. Thus, it is possible to improve not only the quality but also the work efficiency of the control program.

Hereinafter, details of the comparison process on the control programs, and a processing method for determining the difference in the content of the programs, performed by the comparison unit 401 will be described.

Figure 9:
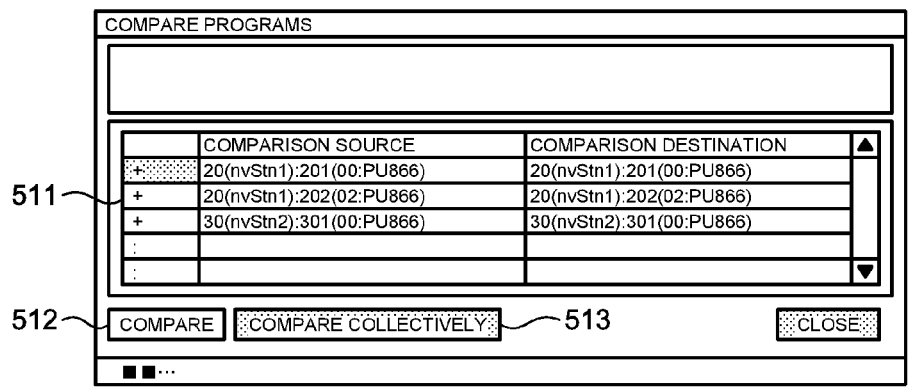
FIG. 9 is a diagram illustrating an example of a display screen on which programs are compared and expanded, of the present embodiment.

When a user selects (clicks) "compare programs" 507 on the product selection screen illustrated in FIG. 7B, the control unit 403 receives the selection, and the display processing unit 402 displays a table of control devices that configure the control system, on the display unit 106 illustrated in FIG. 9.

Figure 10:
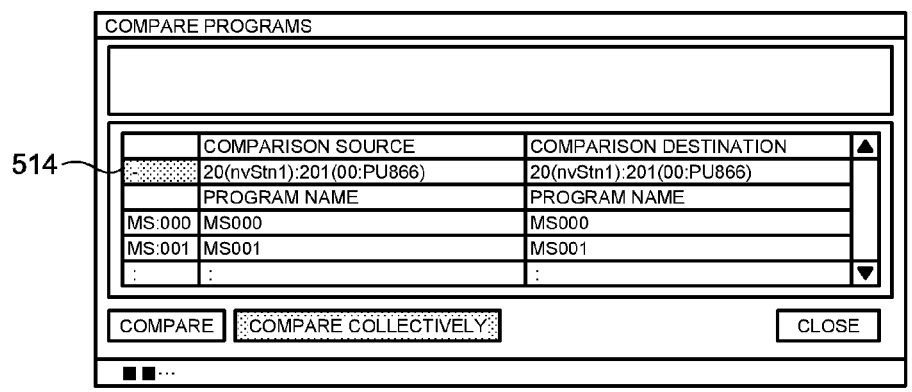
FIG. 10 is a diagram illustrating an example of a display screen on which programs are compared and expanded, of the present embodiment.

The control device on a line 511 with a symbol "+" indicates that the configuration of the applicable control program can be developed to a lower level. Thus, when the user clicks "+" or the line with "+", and clicks "compare" 512, as illustrated in FIG. 10, the display processing unit 402 develops and displays the developed program configuration on the line 514 with "−" and the subsequent lines, as "MS:000", "MS:001", . . . .

Figure 11:
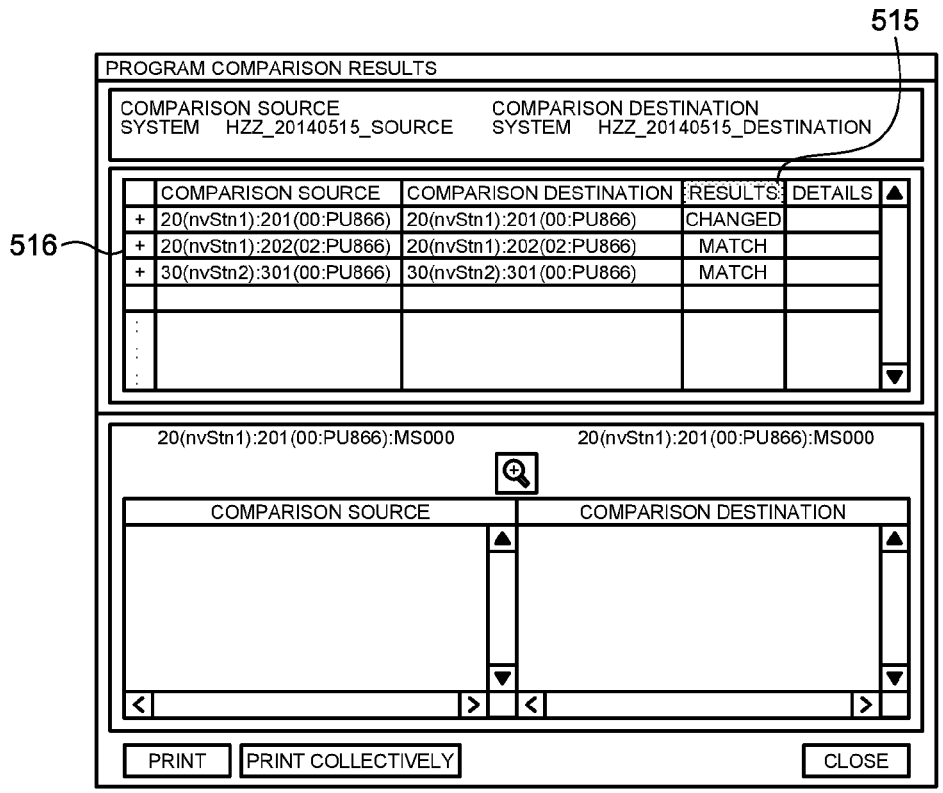
FIG. 11 is a diagram illustrating an example of a display screen on which comparison results on the programs are displayed, of the present embodiment.

Furthermore, when the user clicks "compare collectively" 513, the display processing unit 402 collectively displays the "program comparison results" 515 of each of the control devices, as illustrated in FIG. 11.

Figure 12:
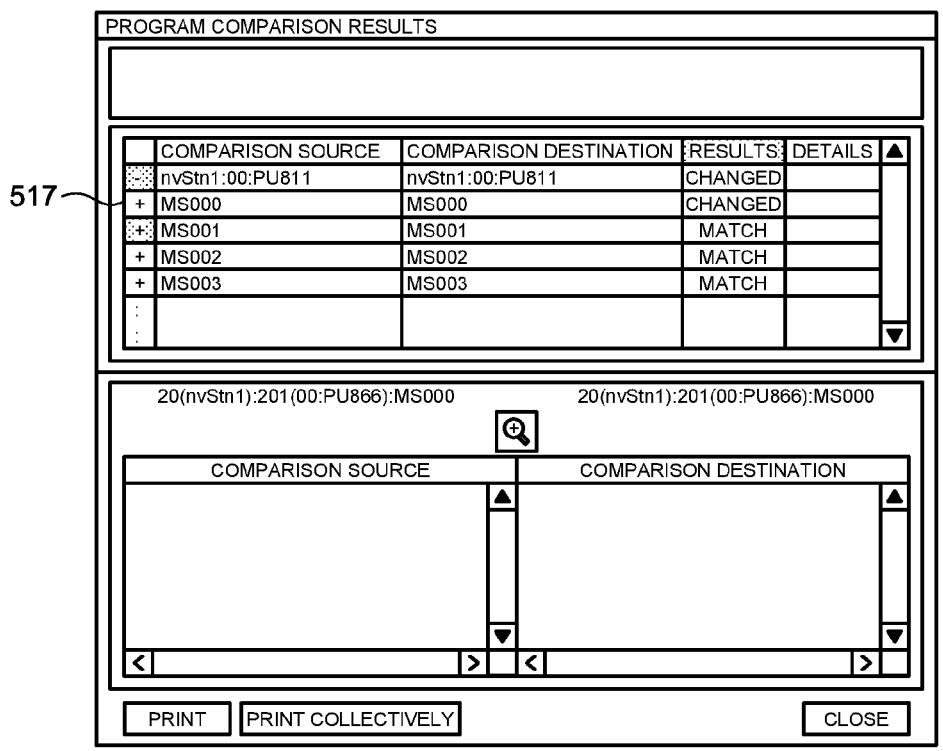
FIG. 12 is a diagram illustrating an example of a collective display screen on which comparison results on the programs are displayed, of the present embodiment.

When the user clicks a "+" symbol 516 of the "program comparison results" 515, the display processing unit 402 develops and displays the programs under the controller, and displays whether the programs are matched with each other or mismatched, as illustrated from "MS:000" to "MS:003" in FIG. 12.

Figure 13:
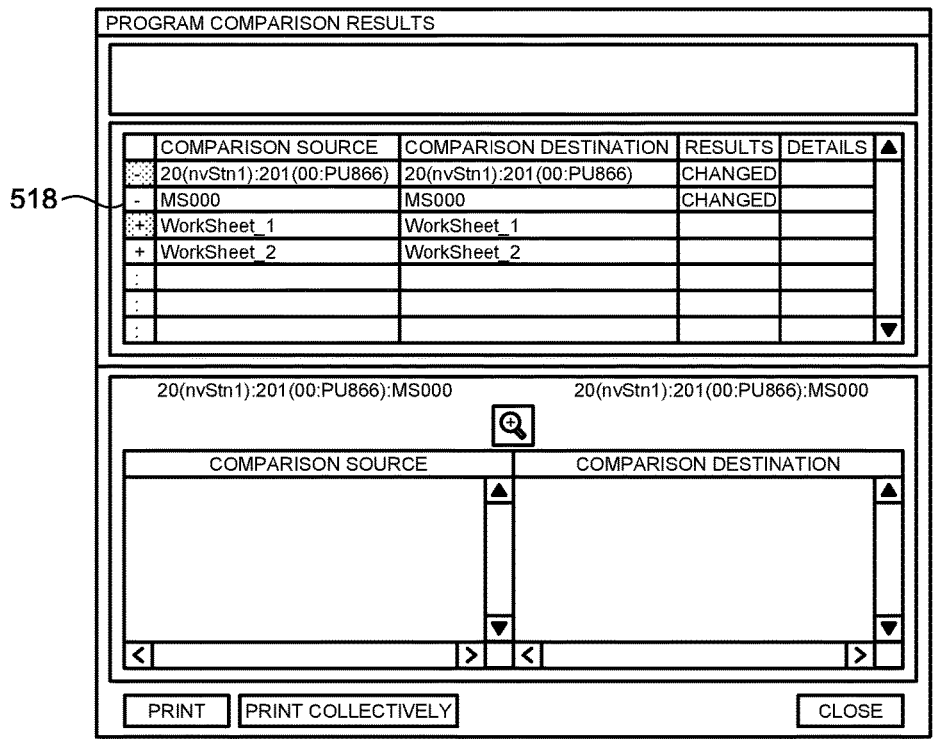
FIG. 13 is a diagram illustrating an example of an expanded screen on which comparison results on the programs are displayed, of the present embodiment.

When the user clicks a line 517 of the program "MS:000" in which the result column on the table in FIG. 12 is described as "Changed", the display processing unit 402 further develops the program "MS:000" to the lower level and displays two WorksSheet_1 and WorkSheet_2 as illustrated in FIG. 13.

Figure 14:
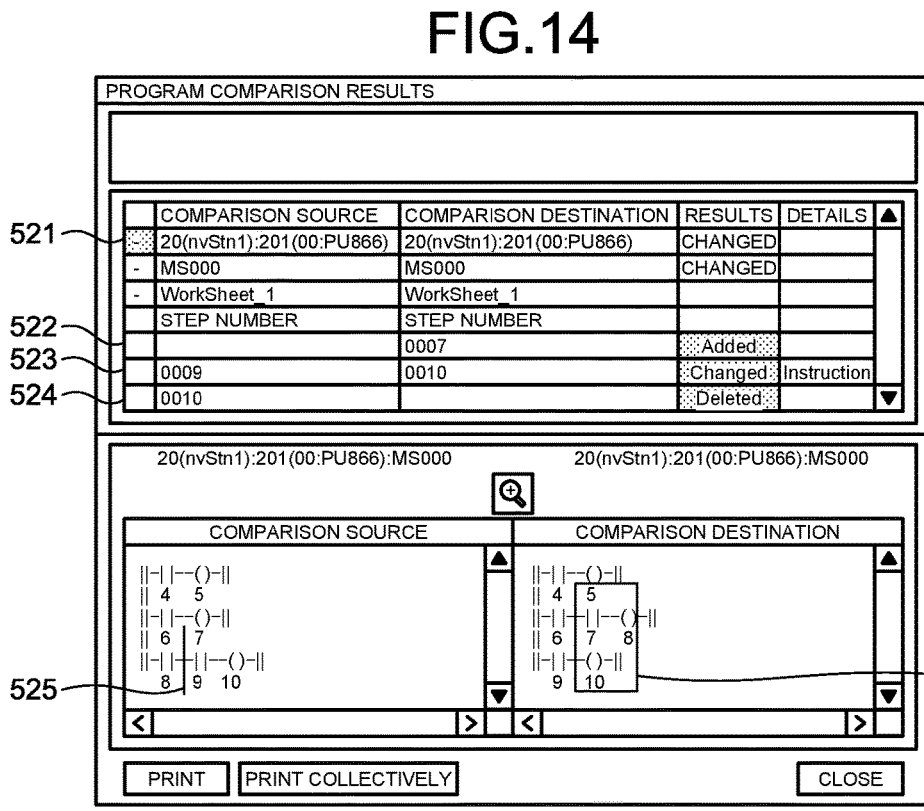
FIG. 14 is a diagram illustrating an example of a display screen on which comparison results on the programs are displayed, of the present embodiment.

When the user double clicks a line 518 of WorkSheet_1, the display processing unit 402 develops and displays the content of the step number of the program step that is different from WorkSheet_1, as in lines 522 to 524 illustrated in FIG. 14.

As a result of the comparison and collation, when it is determined that there are mismatched steps, the comparison unit 401 determines that a step "0009 " of the comparison source and a step "0010 " of the comparison destination are mismatched. However, because the number of steps in the comparison source and the comparison destination are matched, the comparison unit 401 determines that the control program of the comparison destination is "changed". Then, the display processing unit 402 shows "Changed" as illustrated in the result column on a line 523. Furthermore, because the command words are mismatched in the content column, the display processing unit 402 shows "Instruction".

As a result of the comparison and collation, when a step number "0007 " is a step that is determined to be mismatched, and that is only present in the control program of the comparison destination, the comparison unit 401 determines that the step determined to be mismatched is "added" to the control program of the comparison destination. In this case, the display processing unit 402 shows "Added" in the result column on the line 522.

As a result of the comparison and collation, when a step number "0010 " is a block or a step that is determined to be mismatched, and that is only present in the control program of the comparison source, the comparison unit 401 determines that the step determined to be mismatched is "deleted" from the control program of the comparison source. In this case, the display processing unit 402 shows "Deleted" on the line 524.

Furthermore, every time the user double clicks line 522, 523, or 524 which indicates the mismatched parts, the display processing unit 402 illustrates the near-by program including the applicable step in the comparison source and the comparison destination, as markings 525 and 526 illustrated in the lower side of FIG. 14.

Figure 15:
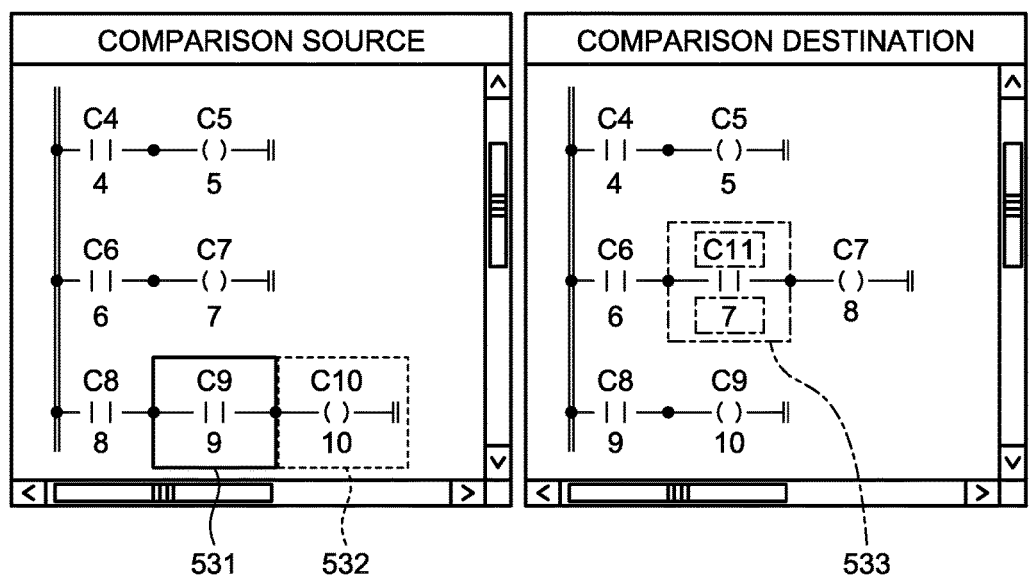
FIG. 15 is a diagram illustrating an example of a display screen on which different parts in the programs are displayed, of the present embodiment.

Also, as illustrated in FIG. 15, the display processing unit 402 can mark the different parts and content as "changed" 531 (actual line), "deleted" 532 (broken line), and "added" 533 (one-dot line) in an identifiable manner, and output the markings as an easily viewable display.

As described above, the present embodiment can provide the control program maintenance device and the control program maintenance method that can determine the modified part and the modified content in the control programs in a short period of time and can easily share the modification quality, in which the maintenance quality and the maintenance work efficiency of the control program are improved.

The control program maintenance program that is executed by the control program maintenance device 10 of the present embodiment is incorporated into, for example, the storage device 105 in advance, and is provided as a computer program product.

The control program maintenance program that is executed by the control program maintenance device 10 of the present embodiment can be provided as a computer program product by being recorded on a computer-readable recording medium such as a compact disc-read only memory (CD-ROM), a flexible disk (FD), a compact disc-recordable (CD-R), a digital versatile disc (DVD) in a installable or executable file format.

Furthermore, the control program maintenance program that is executed by the control program maintenance device 10 of the present embodiment can be provided as a computer program product by storing it in a computer connected to a network such as the Internet, and causing the user to download the program via the network. Also, the control program maintenance program that is executed by the control program maintenance device 10 of the present embodiment may be provided or distributed via a network such as the Internet, as a computer program product.

The control program maintenance program that is executed by the control program maintenance device 10 of the present embodiment has a module configuration including the units described above (comparison unit 401, display processing unit 402, and control unit 403). The units described above are loaded on the main memory 102, when the operation device 101 such as the CPU reads out and executes the control program maintenance program from the storage device 105 described above. Consequently, the comparison unit 401, the display processing unit 402, and the control unit 403 are generated on the main memory 102.

The comparison unit 401, the display processing unit 402, and the control unit 403 may also be configured of a program (software), or implemented by hardware such as an electronic circuit (circuitry).

While some embodiments of the present invention have been described, these embodiments are merely examples, and are not intended to limit the scope of the invention. These novel embodiments may be implemented in various other forms, and various omissions, replacements, and modifications may be made without departing from the scope and spirit of the invention. These embodiments and the modifications are included in the scope and spirit of the invention, and are included in the invention described in the claims and their equivalents.

The invention claimed is:

1. A control program maintenance device that is capable of connecting to a plurality of control devices via a network, the control devices each executing predetermined control by downloading a control program that is used in a control system for controlling a plant from the control program maintenance device, the control program maintenance device comprising:
   a memory that stores therein a first control program and a product tree, wherein the first control program is the control program that has been generated, and the product tree is program configuration information in which a module configuration of each of the control devices and a program configuration of each module are associated with each other in a manner developable to a program step level; and
   a processor that
      sets a range to be compared by referring to the product tree upon receiving a comparison request and compares the first control program registered anew as a comparison source with a second control program uploaded from each of the control devices as a control program of a comparison destination, and
      displays whether the first control program and the second control program are matched or mismatched on a display unit as a result of comparison,
   wherein, when a mismatch occurs, the processor develops the configuration to a lower level by referring to the product tree, displays different parts in the control programs within the range to be compared on the display unit, and displays, in a developable manner and by referring to the product tree, mismatch parts in the control programs of the comparison source and the comparison destination before and after maintenance work is performed on the control program to be maintained.

2. The control program maintenance device according to claim 1, wherein the processor displays the different parts in the control programs within the range to be compared in a comparable manner by marking the different parts on a graphic screen.

3. The control program maintenance device according to claim 1, wherein
the product tree includes:
a plurality of control systems, as a single control system table;
the control devices that configure each of the control systems, as a single control device table for each of the control devices;
a plurality of modules that configure the control device, as a single module table for each of the modules;
a plurality of tasks that configure the module, as a single task table for each of the tasks; and
a plurality of program steps that configure the task, as a single program step table for each of the tasks, wherein
a table identification number attached to each table is associated in a tree format, and
the module configuration of the control system and the program configuration of each of the modules are associated with each other.

4. The control program maintenance device according to claim 1, wherein the processor compares the first control program and the second control program, which are executable, at the program step level.

5. The control program maintenance device according to claim 1, wherein
upon determining that the step to be mismatched is present as a result of comparing the control programs within the range to be compared, the processor determines that:
the control program of the comparison destination is changed when number of steps in the comparison source and the comparison destination, which are determined to be mismatched, are matched with each other;
a step determined to be mismatched by comparison is added to the control program of the comparison destination when the step determined to be mismatched is only present in the control program of the comparison destination; and
a step determined to be mismatched by the comparison is deleted from the control program of the comparison source when the step determined to be mismatched is only present in the control program of the comparison source.

6. The control program maintenance device according to claim 1, wherein the processor displays a changed part, an added part, or a deleted part in the control programs on the display unit based on a determination result by the processor.

7. The control program maintenance device according to claim 6, wherein the processor marks and displays the changed part, the added part, or the deleted part in the control programs on a graphic screen.

8. The control program maintenance device according to claim 1, wherein the processor generates the product tree and registers the product tree in the memory.

9. A control program maintenance method that is executed in a control program maintenance device capable of connecting to a plurality of control devices via a network, the control devices each executing predetermined control by downloading a control program that is used in a control system for controlling a plant from the control program maintenance device;
the control program maintenance device including
a memory that stores therein a first control program and a product tree, wherein the first control program is the control program that has been generated, and the product tree is program configuration information in which a module configuration of each of the control devices and a program configuration of each module are associated with each other in a manner developable to a program step level;
the control program maintenance method comprising
a comparison step that sets a range to be compared by referring to the product tree upon receiving a comparison request and that compares the first control program registered anew as a comparison source with a second control program uploaded from each of the control devices as a control program of a comparison destination, and
a display processing step that displays whether the first control program and the second control program are matched or mismatched on a display unit as a result of comparison, wherein, when a mismatch occurs, the display processing step develops the configuration to a lower level by referring to the product tree; displays different parts in the control programs within the range to be compared on the display unit; and displays, in a developable manner and by referring to the product tree, mismatch parts in the control programs of the comparison source and the comparison destination before and after maintenance work is performed on the control program to be maintained.

10. The control program maintenance method according to claim 9, wherein the display processing step displays the different parts in the control programs within the range to be compared in a comparable manner by marking the different parts on a graphic screen.

11. The control program maintenance method according to claim 9, wherein
the product tree includes:
a plurality of control systems, as a single control system table;
the control devices that configure each of the control systems, as a single control device table for each of the control devices;
a plurality of modules that configure the control device, as a single module table for each of the modules;
a plurality of tasks that configure the module, as a single task table for each of the tasks; and
a plurality of program steps that configure the task, as a single program step table for each of the tasks, wherein
a table identification number attached to each table is associated in a tree format, and
the module configuration of the control system and the program configuration of each of the modules are associated with each other.

12. The control program maintenance method according to claim 9, wherein the comparison step compares the first control program and the second control program, which are executable, at the program step level.

13. The control program maintenance method according to claim 9, wherein
upon determining that the step to be mismatched is present as a result of comparing the control programs within the range to be compared, the comparison step determines that:
the control program of the comparison destination is changed when number of steps in the comparison source and the comparison destination, which are determined to be mismatched, are matched with each other;
a step determined to be mismatched by comparison is added to the control program of the comparison destination when the step determined to be mismatched is only present in the control program of the comparison destination; and
a step determined to be mismatched by the comparison is deleted from the control program of the comparison source when the step determined to be mismatched is only present in the control program of the comparison source.

14. The control program maintenance method according to claim 9, wherein the display processing step displays a changed part, an added part, or a deleted part in the control programs on the display unit based on a determination result by the comparison step.

15. The control program maintenance method according to claim 14, wherein the display processing step marks and displays the changed part, the added part, or the deleted part in the control programs on a graphic screen.

16. The control program maintenance method according to claim 9, further comprising a control step that generates the product tree and registers the product tree in the memory.

17. A program stored on a non-transitory computer-readable recording medium, the program causing a computer that is capable of connecting to a plurality of control devices via a network to execute, the control devices each executing predetermined control by downloading a control program that is used in a control system for controlling a plant from the computer;
the computer including
a memory that stores therein a first control program and a product tree, wherein the first control program is the control program that has been generated, and the product tree is program configuration information in which a module configuration of each of the control devices and a program configuration of each module are associated with each other in a manner developable to a program step level;
the program causing the computer to execute:
a comparison step that sets a range to be compared by referring to the product tree upon receiving a comparison request and that compares the first control program registered anew as a comparison source with a second control program uploaded from each of the control devices as a control program of a comparison destination, and
a display processing step that displays whether the first control program and the second control program are matched or mismatched on a display unit as a result of comparison, wherein, when a mismatch occurs, the display processing step develops the configuration to a lower level by referring to the product tree; displays different parts in the control programs within the range to be compared on the display unit; and displays, in a developable manner and by referring to the product tree, mismatch parts in the control programs of the comparison source and the comparison destination before and after maintenance work is performed on the control program to be maintained.

* * * * *